(12) United States Patent
Madsen et al.

(10) Patent No.: US 6,942,881 B2
(45) Date of Patent: Sep. 13, 2005

(54) PURIFICATION PROCESS FOR IMPROVING TOTAL YIELD OF CURCUMINOID COLORING AGENT

(75) Inventors: Bjørn Madsen, Helsingør (DK); Venancio Hidalgo Garcia, Santa Ana-Cartegena Murcia (ES); Luis Hernandez Vera, Alcantarilla Murcia (ES)

(73) Assignee: Chr. Hansen A/S, Horsholm (DK)

(*) Notice: Subject to any disclaimer, the term of this patent is extended or adjusted under 35 U.S.C. 154(b) by 100 days.

(21) Appl. No.: 10/410,437

(22) Filed: Apr. 10, 2003

(65) Prior Publication Data

US 2003/0180401 A1 Sep. 25, 2003

Related U.S. Application Data

(62) Division of application No. 09/935,684, filed on Aug. 24, 2001, now Pat. No. 6,576,273.
(60) Provisional application No. 60/227,293, filed on Aug. 24, 2000.

(51) Int. Cl.$^7$ .............................................. A61K 35/78
(52) U.S. Cl. ..................................................... 424/756
(58) Field of Search ......................................... 424/756

(56) References Cited

U.S. PATENT DOCUMENTS

| | | | |
|---|---|---|---|
| 4,138,212 A | 2/1979 | Stransky | |
| 4,368,208 A | 1/1983 | Schranz | |
| 5,108,750 A | 4/1992 | Liu | |
| 5,120,538 A | 6/1992 | Oei | |
| 5,210,316 A | 5/1993 | Yang et al. | |
| 5,494,668 A | 2/1996 | Patwardhan | |
| 5,861,415 A | 1/1999 | Majeed et al. | |
| 6,080,411 A * | 6/2000 | Kapadia | 424/760 |
| 6,224,877 B1 | 5/2001 | Gaikar et al. | |
| 6,326,504 B1 | 12/2001 | Piquer et al. | |
| 6,440,468 B1 * | 8/2002 | Quintanilla Almagro et al. | 424/756 |

FOREIGN PATENT DOCUMENTS

| | | |
|---|---|---|
| EP | 0025637 | 3/1981 |
| GB | WO 97/03674 | 2/1997 |
| GB | WO 97/26802 | 7/1997 |
| GB | WO 97/26803 | 7/1997 |
| GB | WO 00/47703 | 8/2000 |
| WO | WO 02/16503 | 2/2002 |

OTHER PUBLICATIONS

European Standard Search Report dated Jan. 8, 2001. for Application DKA200001254. FILED Aug. 24, 2000.
N. Krishnamurthy et al., Trop. Sci. 1976, 18 (1), pp. 34–45, "Oil and Oleoresin of turmeric".
A. G. Perotti, Industrie Alimentari, pp. 66–68, La Curcumina—Un Utile Colorante Vegetale Poco Noto, "Curcumin: An Useful Vegetable Colour Not Much Well–Known", English Translation: "Curcumin—A Little Known Vegetable Colorant".
V. S. Govindarajan. Jun. 1980, CRC Critical Reviews in Food Science and Nutrition, "Tumeric–Chemistry. Technology. and Quality". pp. 199–301.

* cited by examiner

*Primary Examiner*—Christopher R. Tate
(74) *Attorney, Agent, or Firm*—Hunton & Williams

(57) ABSTRACT

The present invention pertains to a process of improving the total yield of curcuminoids from curcuminoid-containing material. More specifically, there is provided a process wherein a second residue, previously considered a waste resulting from a crystallisation step of a curcuminoid-containing phase, is made useful by improving the coloring properties of this second residue by extraction with hexane and/or methanol at ambient temperature. The pro??cess improves the total yield of curcuminoids by 30–40%.

31 Claims, 1 Drawing Sheet

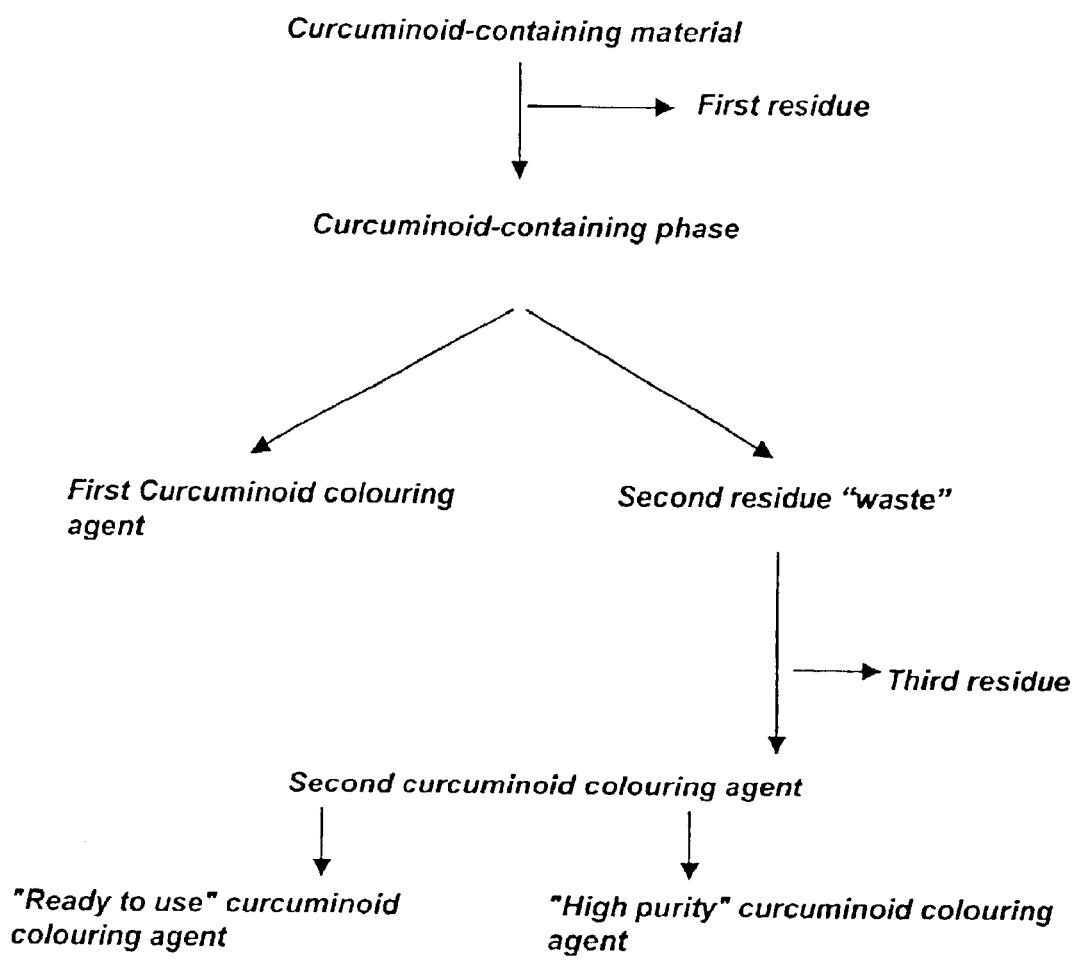

PURIFICATION PROCESS FOR IMPROVING TOTAL YIELD OF CURCUMINOID COLORING AGENT

RELATED APPLICATIONS

This is a divisional of application Ser. No. 09/935,684, filed Aug. 24, 2001, now U.S. Pat. No. 6,576,273, which claimed priority from Provisional Application No. 60/227,293 filed Aug. 24, 2000. The contents of both of the prior applications are incorporated herein by reference.

FIELD OF INVENTION

The present invention relates generally to the field of natural colouring agents and in particular to a purification process for improving the total yield of curcuminoids in the production of curcuminoid colouring agents e.g. from *Curcuma* rhizomes. Specifically, there is provided a novel process for obtaining improved yield of curcuminoids by subjecting curcuminoid-containing materials to at least two separation steps, each of which results in commercially valuable colouring agents.

TECHNICAL BACKGROUND AND PRIOR ART

Turmeric or "yellow root" is a general term for plants and plant materials having a high content of curcuminoids, compounds that have a strong colouring effect and which are used extensively in the colouring of e.g. food products. Turmeric plants belong to rhizomatous *Curcuma* species and have been known for centuries for their flavouring and colouring properties. The plants are grown commercially, particularly in India, but also in Bangladesh, China, Sri Lanka, Indonesia, Taiwan, Haiti, Jamaica and Peru.

It has been found that *Curcuma* plant materials contain three different curcuminoid compounds including, as the predominant colouring compound, curcumin having a strong yellow colour, and minor yellow and brownish-red components, i.e. the term "curcuminoids" includes curcumin (C), reddish orange and with two methoxy groups; demothoxy curcumin (DMC), orange-yellow with one methoxy group and bis-demothoxy curcumin (BDMC), yellow and without a methoxy group. The relative proportions of these three curcuminoid components in the source plant material, in particular in the rhizomes, have been reported by several groups. Thus, Perotti (1975) found a ratio of 60:30:10, Krishnamurthy et al. (1976) one of 49:29:22 and *Govindaraian* (1980) found a ratio of 42:24:34.

The *Curcuma* rhizomes, including the primary or mother rhizomes and several long cylindrical multi-branced secondary rhizomes growing downward from the primary rhizomes, that contain the curcuminoid compounds in an oily cell phase, are harvested at maturity, typically 8 to 9 months after planting.

After harvest, the rhizomes are cured in a process essentially comprising cooking the fresh rhizomes in water. This cooking step aids in producing a product of fairly uniform colour due to the diffusion of the yellow pigments from the individual oil containing cells into the surrounding tissues. After cooking, the material is spread and allowed to dry in the sun. When properly dried, the rhizomes become hard, almost horny and brittle, and of uniform yellow colour. This cured and dried turmeric product is marketed as bulbs and fingers, each type in polished and unpolished forms. This turmeric raw material is then made available to bulk purchase as a starting material for further processing resulting in commercial colouring agents.

Preparing more or less purified solvent extracts of *Curcuma* plant materials, in particular rhizomes as described above, provides commercial curcuminoid-containing colouring agents or compositions. Traditionally, methods for the isolation of curcuminoid colours from the *Curcuma* starting material involve conventional extraction methods typically using solvents of defined purity allowed by national and international food laws for the processing of food additives, and optionally further purification step(s).

The curcuminoid-containing phase that is obtained by the above extraction methods is in the form of an oleoresin comprising an essential oil containing the curcuminoids. The curcuminoid content of the oleoresin is typically in the range of 30–50% by weight. However, the essential oil fraction of the oleoresin has a very strong and bitter flavour, which for many purposes, such as colouring of food products, is undesirable. In order to meet the increasing demand for a highly concentrated flavour-free curcuminoid product, the oleoresin may be processed further. Thus, the oleoresin may subsequently be subjected to a crystallisation step resulting in the obtainment of a curcuminoid powder of a relatively high purity (typically >90% by weight) in respect of curcuminoids. The maximum yield of curcuminoids that can be obtained in this conventional process including the crystallisation step is about 60% by weight, i.e. only about 60% of the curcuminoids initially present in the oleoresin starting material is recovered in the crystal-containing powder.

The residual material that remains after the above separation of curcuminoid crystals consists mainly of the essential oil fraction of the oleoresin and a relatively high proportion of the curcuminoids initially present in the oleoresin, i.e. 40% by weight or more. However, this residual material, although it has a content of curcuminoids that confers to the residual material a yellowish colour, is unsuitable as a colouring agent, not only due to the extensive undesirable flavour, but also due to its relatively low colouring effect. Furthermore, the residual material as such is not directly applicable in e.g. food products. Presently, this residual material is, for these reasons, not utilised commercially and it therefore represents a substantial waste of curcuminoid colouring material. Evidently, this waste of curcumoids in the conventional process for providing concentrated and flavour-free curminoid (or "turmeric") colouring agents or compositions adds significantly to the costs of providing such highly desirable products.

A strong industrial need therefore exists to render processes for providing such useful, and/or pure and concentrated high quality curcuminoid products economically feasible. This has been achieved by the present invention which is based on the discovery that the curcuminoid-containing waste material can be utilised as a starting material for commercially valuable novel curcuminoid colouring agents having excellent and particular colouring properties and, relative to commercial oleoresin products, a similar or even reduced content of undesired flavouring compounds.

SUMMARY OF INVENTION

Accordingly, the present invention pertains in a first aspect to a process for obtaining an improved total yield of curcuminoid colouring agent, the method comprising the steps of (i) providing a curcuminoid-containing material, (ii) subjecting said material to a first separation step so as to obtain a curcuminoid-containing phase and a first residue, (iii) subjecting said phase to curcuminoid crystallisation conditions, (iv) harvesting the thus formed crystals so as to obtain a first curcuminoid colouring agent in the form of curcuminoid crystals, and a second residue containing curcuminoids in non-crystalline form, (v) subjecting said second residue to a second separation step to obtain a second curcuminoid colouring agent, and a third residue.

In another aspect, the invention provides a colouring agent containing curcumin, demethoxy curcumin and bis-demethoxy curcumin, the agent is obtainable, as a second curcuminoid colouring agent, by the above process, the combined amounts of demethoxy curcumin and bis-demethoxy curcumin being above 50% of the total amount of curcuminoids.

DETAILED DISCLOSURE OF INVENTION

A major objective of the present invention is to provide a process for obtaining an improved total yield of curcuminoids for use as commercially valuable curcuminoid colouring agents. As used herein the expression "curcuminoid colouring agent" includes a "colouring agent" or a "colouring composition" containing at least one curcuminoid compound including a compound selected from the group consisting of curcumin, demethoxy curcumin and bis-demethoxy curcumin. Furthermore, the "curcuminoid colouring agent" may be obtainable after a first and/or a second separation step of the provided curcuminoid-containing material. Typically, a commercially valuable colouring agent contains at least 30% by weight of the curcuminoids. Alternatively, the colouring agent may contain any suitable auxiliary compound e.g. emulsifiers, so as to become suitable for specific application e.g. as a food colouring composition.

The process of the present invention involves in a first step that a curcuminoid-containing material is provided. As used herein, the expression "curcuminoid-containing material" includes material derived from any prokaryotic and/or eukaryotic species containing at least one curcuminoid. Preferably, curcuminoid-containing material derived from eukaryotic species is derived from plant species. Such plant species include cultivated or wild plants. In one embodiment of the present invention the plant species include plants of the genus *Curcuma*. Useful curcuminoid producing species of this genus include *Curcuma longa* L., *C. aromatica* Salisb., *C. amada* Roxb., *C. zedoaria* Rosc. and *C. xanthorrhiza* Roxb.

The plant material is advantageously treated in a way so as to provide the curcuminoids in a uniform and easily accessible condition. Such treatments include boiling, curing and subsequent drying of the curcuminoid-containing plant material prior to separation of the curcuminoids. The plant starting material can be divided into particles prior to the first separation step.

It is also possible to provide curcuminoid-containing materials by subjecting wild type curcuminoid-containing organisms to a mutagenisation treatments and select a strain that is capable of producing excess amount of one or more of the curcuminoids or a strain capable of producing curcuminoids in a different ratio as compared to the parent strain. The use of microorganisms or plants that have been genetically modified to produce curcuminoids as starting material is also contemplated.

A curcuminoid-containing starting material can be selected that has one of the curcuminoids e.g. curcumin as the predominant curcuminoid. Additionally, curcuminoid-containing starting material may be provided by mixing curcuminoid-containing material that is derived from different sources as defined above.

The first separation step in the process of the present invention includes any separation procedure resulting in a phase containing the bulk of the curcuminoid compounds of the curcuminoid-containing material i.e. a curcuminoid-containing phase, and a phase essentially comprising waste matter i.e. a first residue, of the curcuminoid-containing material. Where the curcuminoid-containing material is a plant material the first residue will be the plant matter devoid of the curcuminoids. A separation procedure as used in the present process is typically selected from the group consisting of a precipitation, an extraction, a filtration and a distillation. In a preferred embodiment the separation step is an extraction performed by adding one or more organic solvents to the curcuminoid-containing material. In the present context an extraction may also include a supercritical extraction using carbon dioxide as a solvent. After extraction the phases can be separated by e.g. filtering, to obtain the two above phases.

Adding any suitable solvent to the curcuminoid-containing material as defined above can carry out an extraction. Suitable solvents include aromatic hydrocarbons, aliphatic hydrocarbons such as petroleum ether, heptane, pentane, hexane; chlorinated hydrocarbons such as ethylene dichloride, dichloromethane, trichloro-ethylene; ketones such as acetone; esters such as ethylacetate; alcohols such as methyl alcohol, ethyl alcohol, isopropyl alcohol and n-butanol. It is contemplated that the first and second separation step of the present invention also encompasses the use of any mixture of solvents.

According to the invention, the resulting curcuminoid-containing phase may be in any form including a liquid form, a semi-liquid form and a solid form. Preferably, the curcuminoid-containing phase is in a semi-liquid form characterised as an oleoresin comprising an essential oil fraction containing the curcuminoids. Accordingly, the curcuminoids are dispersed in an oily phase. This curcuminoid-containing phase is the traditional colouring and flavouring product used as described hereinbefore. Although some of the curcuminoids initially present in the plant are retained in the first residue the colour content of the oleoresin is defined as being 100% for the purpose of subsequent calculations of yield in the further processing of the curcuminoid containing phase. The curcuminoids in the oleoresin is, however, diluted by the presence of the oily phase, and presence of impurities. Accordingly, the purity, or strength, of the oleoresin is about 40% by weight (in the following, all percentages are by weight unless otherwise stated). In the present context the term "pure", "purity" or "strength" refers to the content by weight of curcuminoids in the sample.

In one embodiment of the present invention curcumin is the predominant curcuminoid in the curcuminoid-containing phase. The ratio of the three curcuminoids in the curcuminoid-containing phase is typically: curcumin about 50–70%, demethoxy curcumin about 10–30% and bis-demethoxy curcumin about 10–30% the sum of the three compounds being 100%.

In order to obtain a highly concentrated flavour-free curcuminoid product, the curcuminoid-containing phase (oleoresin) is processed further. The curcuminoid-containing phase obtained by the process of the present invention is subjected to curcuminoid separation conditions typically a crystallisation step, resulting in a curcuminoid powder. Such a separation is a classic separation procedure, which also include a precipitation, a centrifugation, a filtration and a distillation. The person of skill in the art can easily select an optimal method for this purpose.

After subjecting the curcuminoid-containing phase to crystallisation conditions the formed crystals are harvested as a curcuminoid powder whereby a first curcuminoid colouring agent is formed. This first curcuminoid colouring agent is a powder preferably having, in respect of curcuminoids, a purity of at least 70% such as at least 80%, 85%, 90% or more preferably a purity of at least 95% or even 99%. The first curcuminoid colouring agent is further characterised in having a typical ratio (as defined above) of the three curcuminoids in the curcumin powder: curcumin about 65–85%, demethoxy curcumin about 10–30% and bis-demethoxy curcumin about 5–15%, the sum of the three compounds being 100%. The yield of this process is about 60% of the cuminoids initially present in the curcuminoid-containing phase (oleoresin).

During the crystallisation process the oily phase, flavouring compounds and any impurities remain in solution together with the remaining curcuminoids. This remaining solution is characterised as "a second residue" containing curcuminoids in a non-crystalline form. Currently, this second residue is considered a waste due to its very limited commercial value.

The improvement provided by the present invention is to obtain a commercially valuable second curcuminoid colouring agent by subjecting this second residue to a second separation step.

The second residue is in a form selected from a liquid form, a semi-liquid form and a solid form. The content of curcuminoids is typically at least 30% of the curcuminoids initially present in the oleoresin such as at least 35% including at least 40% or at least 50%, or even more if the crystallisation step has not been performed under optimal conditions.

In accordance with the invention, the second residue is subjected to a second separation step, which may be carried out using any known extraction method, and extraction solvent as described hereinbefore. In one embodiment, extraction of the second residue is performed with hexane as the solvent of choice. Preferably, hexane is applied at a temperature in the range 10–30° C. e.g. about 20° C., optionally under stirring of the solution.

The second separation step results in a second curcuminoid colouring agent. This colouring agent can be in a liquid, a semi-liquid or a solid form. Most preferably, the second curcuminoid colouring agent is in a solid form as a "High purity" curcuminoid powder. The "High purity" curcuminoid colouring agent contains the three above curcuminoid compounds. The ratio of the three compounds in the curcuminoid-containing phase is typically: curcumin about 35–49%, demethoxy curcumin about 20–30% and bis-demethoxy curcumin about 20–30%, the sum of the three compounds being 100%.

The "High purity" curcuminoid colouring agent has a purity by weight of curcuminoids as compared to the second residue including a purity of at least 25%, such as at least 30% including at least 40% or even at least 50%. The total yield of curcuminoids is improved by at least 25% of the curcuminoids initially present in the curcuminoid-containing phase (oleoresin) such as at least 30%, 35% or even preferably at least 40% of the curcuminoids initially present in the curcuminoid-containing phase (oleoresin). It is contemplated that the "High purity" curcuminoid colouring agent may be diluted to any desired extend using any suitable dilution agent.

The second separation step as described above may alternatively be performed as a liquid: liquid extraction using e.g. methanol and hexane. Methanol is applied to the second residue to form a mixture which can be extracted by stepwise adding of hexane to the mixture and subsequent separation of the two phases formed. Preferably an emulsifier is added to the resulting methanol phase containing the curcuminoids. It is however contemplated that any auxiliary agent as described below can be used. After evaporation of the solvent phase a second curcuminoid colouring agent is formed. This second curcuminoid colouring agent can be in a liquid and semi-liquid state and is characterised as being water/oil soluble/dispersible and hence "Ready to use".

Auxiliary agents for use subsequent to the liquid:liquid extraction may be any agent useful in conferring a desired property to the "Ready to use" curcuminoid colouring agent. Desired properties include e.g. solubility properties useful for specific applications. Examples of useful auxiliary agents include, but are not limited to oils and emulsifiers. A useful auxiliary agent is a food grade emulsifier such as Lecithin, Sorbitan derivatives, Polysorbate or additives like glycerol and Propylene glycol.

The "Ready to use" curcuminoid colouring agent contains the three previously described curcuminoid compounds. The ratio of the three compounds is identical to the ratio as described above for the second curcuminoid colouring agent. The purity of the "Ready to use" curcuminoid colouring agent is dependent on the amount of an auxiliary agent added in the alternative extraction and may be of a purity in the range of 0.25%–40% by weight of curcuminoids as compared to the second residue. However, the total yield of curcuminoids by using the liquid:liquid extraction is comparable to the yield obtained for the second curcuminoid colouring agent i.e. the total yield of curcuminoids is improved by at least 25% of the curcuminoids initially present in the curcuminoid-containing phase (oleoresin) as defined hereinbefore.

In accordance with the invention, the second separation step results in a third liquid residue, essentially void of curcuminoids. This third residue contains the major part of flavouring compounds of the turmeric oleoresin. For certain applications this third residue is useful as a flavouring compound. Furthermore, the third residue is valuable as a medicament or for use in the manufacturing of a medicament e.g. for treating infectious diseases. It is further contemplated that the third residue is useful as a preserving agent e.g. in the preservation of food products or pharmaceuticals.

It is another objective of the present invention to provide a novel colouring agent containing curcumin, demethoxy curcumin and bis-demethoxy curcumin. The colouring agent is obtainable as a second curcuminoid colouring agent, by the process of the invention and the combined amount of demethoxy curcumin and bis-demethoxy is typically about 50–70% by weight of the total amount of curcuminoids, such as at least 50%, at least 55%, at least 60%, or at least 70%. This novel colouring agent may be used directly for colouring purposes as defined below. Furthermore, it is to be understood that the features of the colouring composition as described below applies for the novel colouring agent as well.

A composition comprising such a colouring agent is also encompassed by the present invention. Such a composition may comprise a further colouring agent selected from a natural and/or a synthetic colouring agent. Synthetic colouring agents are normally very pure chemicals with standardised colouring strength. The colours are available as powders, pastes, granules and solutions and may include compounds e.g. selected from Brillant black, Brown FK, Fast Green, Sunset yellow, Carmoisine and Indigo carmine.

Commercially available natural colouring agents are mixtures of pigments found in nature. Common natural colours include flavonoids, carotenoids, Betalaine pigments, quininoid pigments, porphyrin pigments and malanoidin pigments.

The synthetic as well as the natural colours may be provided as lakes e.g. as aluminium chelates produced by reacting solutions of the colours with freshly prepared alumina. In general, such lakes have enhanced light stability over the soluble dye and can be used for colouring dry powder products.

The composition of the invention may e.g. be encapsulated as described in WO 97/26802 and WO 97/26803 which is hereby incorporated by reference. By this encapsulation, the composition may be applied in environments which are normally considered as unfavourable for non-encapsulated pigments such as e.g. hydrophobic pigments in aqueous environments. Furthermore, the encapsulation provides a form wherein the composition essentially does not migrate from one to another compartment e.g. in foodstuffs. In one embodiment of the present invention the further colouring agent may be a curcuminoid such as e.g. the first curcuminoid colouring agent obtained by the process of the present invention.

In a further aspect the invention pertains to the use of a composition according to the invention as a colouring agent in the manufacturing of an edible product. As used herein, the expression "edible product" denotes any solid or liquid food product. Edible products include the product types referred to as "nutraceuticals", "functional foods" or "health improving foods"; i.e. food products or food supplements comprising components that are considered to confer certain health improving characteristics. Such products may be in any conventional form including products in tablet or capsule dosage forms that may comprise separate compartments which can be coloured separately. It will be appreciated that when a composition according to the invention is used in the manufacturing of such a nutraceutical products, the colouring substance can, in addition to its colouring effect, also confer to such products a nutritionally and/or health improving effect. Such health improving effects are well described in the art and include antioxidant activities, In other useful embodiments, the composition of the invention is used in the manufacturing of an antiseptic or antimicrobial compound, optionally by including the third residue in the composition. The term "antimicrobial compound" includes agents that kill micro-organisms (bactericidal) or inhibit the growth (bacteriostatic) of micro-organisms.

In a further useful embodiment, the composition according to the invention is used for the colouring of textiles or polymers. In the present context the term "textile" refers to any filament, fibre or yarn that can be made into fabric or cloth and used in e.g. wearing apparel, household linens and beddings, upholstery, draperies and curtains, wall coverings, rugs and carpets.

The invention is further illustrated in the following non-limiting examples and in the drawing, where FIG. 1 shows the process steps of the present invention.

EXAMPLE 1

Analysis of Curcuminoid Contents in Samples of Fresh Curcuminoid-containing Plant Material, Turmeric Oleoresins, Curcumin Powders and Waste (the Second Residue)

Information from industrial processes to obtain curcuminoid colouring agents and information of the curcuminoid contents in the end product is very limited as the processes are regarded as restricted information by the firms. Accordingly, a study of the products on the market was performed, covering different raw materials, turmeric oleoresins and commercial curcumin powders in order to gain information on the currently used processes for extraction of the colouring compounds from the raw material. Furthermore, samples of the second residue resulting from the crystallisation process was obtained and analysed.

The colouring compounds of turmeric, as described hereinbefore, consists of the three colouring compounds curcumin (C), demethoxycurcumin (DMC) and bis-demethoxycurcumin (BDMC). These colours were synthesised, and using HPLC with these synthetic compounds as standards, the curcuminoid compositions of the different samples were estimated.

Results of analysis of curcuminoid ratios in different raw materials are presented in table 1. The content of C was found to be in the range of 52–63%, the content of DMC was in the range of 19–26%, and the content of BDMC was in the range of 19–28%. The overall picture of the distribution of the three curcuminoid compounds is relative similar in the analysed samples. Small variations in the curcuminoid content between the individual samples were observed and this was most probably due to the nature of the raw material, time of harvest etc.

TABLE 1

Curcuminoid composition of raw materials from India. The results are based on synthetic standards and the values are expressed as weight % of the total colour content.

| Trade name | C (%) | DMC (%) | BDMC (%) |
|---|---|---|---|
| Desi Kadappa finger turmeric (polished) | 58.7 | 22.6 | 18.7 |
| Salem finger turmeric (polished) | 61.0 | 19.7 | 19.4 |
| Rajpuri finger turmeric | 52.8 | 21.5 | 25.7 |
| Nezamabad finger turmeric | 62.2 | 20.7 | 17.1 |
| Sadashipet finger | 52.9 | 23.7 | 23.4 |
| AFT (bulp split) | 62.4 | 19.2 | 18.4 |
| Barsi Kocha turmeric | 52.4 | 19.7 | 27.9 |
| Panamgaly turmeric (Erode) | 63.2 | 18.8 | 18.0 |
| Erode Ghatta turmeric | 61.1 | 18.7 | 20.1 |
| Erode finger turmeric | 59.0 | 21.8 | 19.3 |
| Madras finger turmeric (MFT) | 60.1 | 19.7 | 20.2 |
| Meghalaya split turmeric | 54.5 | 26.3 | 19.2 |
| Salem Panamgali | 59.8 | 20.6 | 19.6 |
| Alappy finger turmric (AFT) | 60.7 | 20.2 | 19.1 |

The colour content and composition in different commercial and experimental samples of turmeric oleoresins, powders and wastes are presented in table 2. This table illustrates that the curcuminoid composition in the first 4 oleoresins is within the limits observed for the raw material, dried rhizomes. The last 2 oleoresins are experimental products with pure curcumin powder added.

TABLE 2

Curcuminoid content in different commercial and experimental samples of turmeric oleoresins, curcuminoid powders and waste materials, the value of C, DMC and BDMC are expressed as % weight of the total colour content.

| Samples | type | Curcuminoids (% weight) | C (%) | DMC (%) | BDMC (%) |
|---|---|---|---|---|---|
| A | oleoresin | 41.61 | 61.9 | 21.0 | 17.1 |
| B | " | 39.32 | 64.3 | 20.1 | 15.6 |

TABLE 2-continued

Curcuminoid content in different
commercial and experimental samples of turmeric
oleoresins, curcuminoid powders and waste materials, the value of C,
DMC and BDMC are expressed as % weight of the total colour content.

| Samples | type | Curcuminoids (% weight) | C (%) | DMC (%) | BDMC (%) |
|---|---|---|---|---|---|
| C | " | 37.44 | 54.0 | 23.5 | 22.4 |
| D | " | 40.26 | 61.5 | 19.1 | 19.4 |
| E* | " | 37.31 | 72.7 | 17.2 | 10.1 |
| F* | " | 45.46 | 73.3 | 16.6 | 10.1 |
| H | powder | 95.94 | 81.6 | 15.9 | 2.5 |
| I | " | 96.67 | 87.4 | 11.2 | 1.4 |
| J | " | 95.13 | 77.1 | 17.7 | 5.2 |
| K | " | 97.03 | 71.1 | 19.3 | 9.6 |
| L | " | 93.81 | 73.8 | 19.1 | 7.1 |
| M | " | 96.21 | 81.3 | 16.2 | 2.5 |
| N | " | 91.60 | 76.3 | 19.7 | 4.1 |
| O | " | 94.40 | 77.1 | 18.3 | 4.6 |
| P | " | 93.66 | 80.7 | 16.5 | 2.8 |
| Q | " | 96.60 | 85.7 | 12.6 | 1.7 |
| R | " | 89.90 | 80.4 | 15.7 | 4.0 |
| S | " | 90.99 | 80.4 | 15.8 | 3.8 |
| U | waste | 14.58 | 48.0 | 24.6 | 27.4 |
| V | " | 13.40 | 41.0 | 25.4 | 33.6 |
| X | " | 17.87 | 28.9 | 26.6 | 44.5 |

*: Added curcuminoid powder to obtain a desirable colouring strength of the oleoresin.

As illustrated by the table (table 2) the ratio of curcuminoids in the oleoresin was equal to the ratio found in the raw material (table 1). However, the curcuminoid powders showed a completely different ratio of curcuminoids as compared to the oleoresins and the raw material. The content of C was between 71–88%, the content of DMC between 11–20% and the content of BDMC between 1–10%. The variation in curcuminoid content between the different samples is probably dependent on the turmeric oleoresin and the process of crystallisation (solvent, solvent/oleoresin ratio, parameter settings during processing etc.). In the powder product the content of C was increased, the content of DMC reduced and the content of BDMC also reduced as compared to the content of the curcuminoids in the fresh starting material and the oleoresins.

This observation explains the low yield in the process where the turmeric oleoresin is converted into a turmeric powder. A crystallisation process of a chemical substance containing a main component at approximate 60% by weight and 2 other components in approximate equal amounts can not be expected to result in a yield of more than 60%. The most abundant component in a mixture of chemical compounds tends to crystallise in a more pure form than other components present. Further use of solvents and/or recrystallisation will always lead to a relatively poor yield and this yield will depend on the concentration of the main component and the number of recrystallisations.

As a result of the conventional crystallisation process a second residue is obtained. This "waste" was analysed and table 2 shows the curcuminoid content hereof. As illustrated, a completely different picture is obtained. Here the ratio of the 3 different components was in approximate the same amounts. The ratio of the three curcuminoids (C, DMC and BDMC) was found to be 40:25:35, respectively. Hence, a further crystallisation of this composition can not lead to an increase of curcumin-crystals.

Table 2 further illustrates the purity, or strength, of the colouring compositions, calculated as the total percentage of curcuminoids in the material (% weight). It appears from the table that the purity of the oleoresin is about 40% by weight, of the powder about 95% by weight and of the waste about 15% by weight. As described above, and as illustrated by the table, the strength of the waste is unacceptable as a commercially valuable product. Although, 40% of the original 100% of curcuminoids in the oleoresin is contained in the waste, the crystallisation process leaves the remaining curcuminoids in a solution with all impurities, the essential oil fraction and all flavouring compounds. Accordingly, the colouring strength of the solution is only 15% by weight and furthermore, the solution is strongly flavoured and as such of an unacceptable quality.

As mentioned above, there is a great industrial interest in providing the curcuminoids in the second residue in a commercially valuable form. Different approaches to extracting the oil fraction from the curcuminoid fraction were tested and the second residues resulting from the crystallisation processes were used as a starting material in the following 3 Examples.

During the attempts to extract curcuminoids from the waste, the contents of the curcuminoids were analysed spectrophotometrically.

EXAMPLE 2

Improving Yield by Refluxing the Second Residue in Hexane

To the second residue hexane was added in equal amounts in a flask. The mixture was refluxed for 30 minutes. During reflux an oily phase at the bottom was observed. The sample was cooled and left for 1 month. A sticky precipitate containing the major part of curcuminoids was observed. The experiment clearly showed that refluxing in concentrated hexane was not adequate to obtain a useful product.

EXAMPLE 3

Extraction of the Hexane Extractable Oil by Changing the Hexane/Acetone Ratio

Hexane and acetone was added to the second residue (12:3:10). The mixture was refluxed for a couple of hours and left overnight. The solvent contained only small amounts of curcuminoids and the fraction of acetone was increased in two steps to an amount that resulted in a mixture of hexane, acetone and the second residue in a ratio of (12:8:10), respectively. After adding half of the acetone the mixture were refluxed for 1.5 hours, then the remaining acetone was added and the mixture was refluxed for 1.5 hours. The sample was transferred to a refrigerator and left overnight. After 3 month in refrigerator the result was a sticky useless powder.

EXAMPLE 4

Extraction with Hexane at Ambient Temperature

While stirring, the second residue was added to hexane in a ratio of 1:4 in a flash. The mixture was stirred at ambient temperature for 2 days. A powder filtrate developed, the filtrate was isolated and washed with hexane.

The hexane was evaporated and the powder filtrate was split into two. One was dried at 40° C. and the second was dried at 70° C. Drying at 40° C. resulted in a yellow powder which contained 30.5% curcumin. This powder tended to get darker with time and caramelise.

Drying at 70° C. resulted in a dark brown powder which contained 31.0% curcumin.

Total yield of this process was found to be 96% (relative to the initial content of curcuminoids present in the second residue). The ratio of the three curcuminoids was found to equal the ratio found in the second residue "waste" (illustrated in Table 2).

The obtained second curcuminoid colouring agent was characterised as a "High purity" colouring agent.

EXAMPLE 5
Extraction with Methanol at Ambient Temperature

An alternative method of extraction is a liquid:liquid extraction performed using methanol and hexane. 180 Kg of the second residue was pumped to a production tank. 200 Kg methanol was added. The mixture was stirred at ambient temperature for 15 minutes. 800 L of hexane was added and after stirring for 1 hour the phases were separated using a bottom valve. The methanol phase was washed with hexane and subsequent separated in two further steps. In the first step 800 L of hexane were added in the second step 1000 L of hexane was added. The mixture were stirred for 30 minutes and separation was performed after 1 hour.

The resulting methanol phase was pumped together with 300 Kg polysorbate to an evaporator. The solvent was removed by heating to 85° C. under vacuum. A total of 370 kg "Ready to use" water soluble curcumin product was obtained by the above method.

A subsequent extraction identical to the above liquid:liquid extraction was performed. The starting material included the methanol/oleoresin phase separated from the hexane extract from the previous extraction, another 180 kg of the second residue and 300 Kg of metanol. This subsequent procedure improved the total yield of the extraction as a minor part of curcuminoids are present in the hexane phase of the first extraction. However, a total yield of 77% was obtained by the first extraction and the total yield by running the extraction and in two series was 95% of the curcuminoids present in the second residue.

The above extraction resulted in a water soluble second curcuminoid colouring agent with a colour content of 10%. These characteristics render the agent useful for direct application in e.g. food products, accordingly the second curcuminoid colouring agent as obtained by the liquid:liquid extraction is characterised as a "Ready to use" colouring agent.

In Conclusion

The examples show that it is possible to obtain an improved yield of the process of the invention. The total yield of the entire process starting with a curcuminoid-containing phase (the oleoresin) may be close to 100% using the process of the invention where the remaining curcuminoids in the waste is harvested as a second curcuminoid colouring agent in a "Ready to use" or "High purity" form as shown in table 3 which summarises the results.

TABLE 3

A summary of the purity of the different products involved in the process.

| material | oil fraction (%) | curcuminoid fraction (%) | Sum (%) |
|---|---|---|---|
| oleoresin | 52.9 | 39.8 | 92.7 |
| powder | 0 | 97.7 | 97.7 |
| "waste", second residue | 64.0 | 14.6 | 78.6 |
| regenerated waste, Example 4 | 47.0 | 30.5 | 775 |
| regenerated waste, Example 4 | 47.4 | 31.0 | 78.4 |
| regenerated waste, Example 5 | 49.7* | 38.0 | 87.7 |

*Corrigated for the content of polysorbate in the final "Ready to use" colouring agent.

As illustrated in table 3 the colouring strength of the oleoresin is about 40% by weight as described before. The "waste" was previously considered a useless product due to the poor colouring properties. The process of the present invention leads to a regenerated waste which has a purity and thereby a colouring strength which is comparable to the strength of commercial oleoresin product. This implies that the regenerated waste may be sold as an oleoresin or, alternatively used as a novel product with particular and new colouring properties due to the altered ratio of the three curcuminoids.

The Table further illustrates that some presently unknown impurities are in the samples as the sum of the oil fraction and the colour fraction is 70–90.

REFERENCES

Govindarain (V. S. Turmeric-Chemistry, Technology and Quality, CRC Crit. Rev. Food Sci. Nutr., 12, 199 (1980), p. 257).

Krishnamurthy N., Mathew A. G., Nambudiri E. S., Shivasankar S., Lewis Y. S. and Natarajan C. P. 1976. Oil and oleoresin of turmeric. Trop. Sci. 18:37.

Perotti A. G. 1975. Curcumin—a little known but useful vegetable colour. Ind. Aliment. Prod. Veg. 14:66.

What is claimed is:

1. A colouring agent comprising curcumin, demethoxy curcumin and bis-demethoxy curcumin, the colouring agent including combined amounts of the demethoxy curcumin and the bis-demethoxy curcumin which are at least 50% of the total amount of curcuminoids, the coloring agent obtained, as a second curcuminoid colouring agent, by a process comprising:
    (i) providing a curcuminoid-containing material,
    (ii) subjecting said material to a first separation step so as to obtain a curcuminoid-containing phase and a first residue,
    (iii) subjecting said phase to curcuminoid crystallisation conditions to form crystals thereof,
    (iv) harvesting the thus formed crystals so as to obtain a first curcuminoid colouring agent in the form of curcuminoid crystals, and a second residue containing curcuminoid in non-crystalline form,
    (v) subjecting said second residue to a second separation step to obtain the second curcuminoid colouring agent, and a third residue.

2. A method of colouring an edible product comprising adding to the edible product the colouring agent according to claim 1.

3. A composition comprising the colouring agent according to claim 1.

4. A composition according to claim 3, comprising a further colouring agent.

5. A composition according to claim 4 wherein the further colouring agent comprises at least one of a natural and a synthetic colouring agent.

6. A composition according to claim 5 wherein the natural colouring agent is a curcuminoid.

7. A method of making an edible product comprising adding to the edible product a composition according to claim 3.

8. A method of manufacturing a pharmaceutical product comprising combining the composition of claim 3 with a pharmaceutically acceptable carrier.

9. A method of manufacturing an antimicrobial product comprising adding to the antimicrobial product a composition according to claim 3.

10. A method of modifying a food or a pharmaceutical comprising adding to the food or pharmaceutical a health-improving ingredient which is the composition according to claim 3.

11. A method of colouring textiles or polymeric materials comprising contacting the textiles or polymeric materials with the composition according to claim 3.

12. An edible product which comprises the colouring agent according to claim 1.

13. A pharmaceutical product comprising the colouring agent according to claim 1.

14. An antimicrobial product comprising the colouring agent according to claim 1.

15. A textile or a polymeric material comprising the colouring agent according to claim 1.

16. A composition according claim 3, wherein the colouring agent is encapsulated, thereby enabling the composition to be applied in environments which are considered unfavourable for non-encapsulated pigments.

17. A composition according to claim 16, wherein the non-encapsulated pigments are hydrophobic pigments in aqueous environments.

18. A composition according to claim 5, wherein the at least one of a natural and a synthetic colouring agent is a lake.

19. An antiseptic or antimicrobial product comprising the composition of claim 3.

20. An antiseptic or antimicrobial product according to claim 19, further comprising the third residue.

21. A method of preparing an antiseptic or antimicrobial product comprising combining the composition of claim 3 with a pharmaceutically acceptable carrier.

22. A method according to claim 21, further comprising combining the third residue with the composition of claim 3 and the pharmaceutically acceptable carrier.

23. A coloring agent according to claim 1 wherein the second separation step in (v) is selected from the group consisting of a precipitation, an extraction, a filtration, a crystallisation, a recrystallisation and a distillation.

24. A coloring agent according to claim 23 wherein the extraction is performed using an organic solvent.

25. A coloring agent according to claim 24 wherein an auxiliary agent is added to the solvent comprising after the extraction.

26. A coloring agent according to claim 23 wherein the extraction is performed as a liquid:liquid extraction.

27. A coloring agent according to claim 26 wherein the extraction is performed using methanol and hexane at ambient temperature.

28. A coloring agent according to claim 25 wherein the auxiliary agent is a food grade additive.

29. A coloring agent according to claim 28 wherein said auxiliary agent is selected from the group consisting of an oil, an emulsifier, a food grade emulsifier and an additive.

30. A coloring agent according to claim 29 wherein the food grade emulsifier is lecithin, a sorbitan derivative or a polysorbate.

31. A coloring agent according to claim 29, wherein the additive is glycerol or propylene glycol.

* * * * *